(12) United States Patent
Boch

(10) Patent No.: US 8,351,987 B2
(45) Date of Patent: Jan. 8, 2013

(54) WIRELESS NETWORK COMMUNICATION APPARATUS, METHODS, AND INTEGRATED ANTENNA STRUCTURES

(75) Inventor: Erik Boch, Ottawa (CA)

(73) Assignee: Dragonwave, Inc., Kanata, ON (CA)

( * ) Notice: Subject to any disclaimer, the term of this patent is extended or adjusted under 35 U.S.C. 154(b) by 957 days.

(21) Appl. No.: 12/311,359

(22) PCT Filed: Dec. 22, 2006

(86) PCT No.: PCT/CA2006/002121
§ 371 (c)(1),
(2), (4) Date: Mar. 27, 2009

(87) PCT Pub. No.: WO2008/037051
PCT Pub. Date: Apr. 3, 2008

(65) Prior Publication Data
US 2009/0274130 A1    Nov. 5, 2009

Related U.S. Application Data

(60) Provisional application No. 60/827,084, filed on Sep. 27, 2006.

(51) Int. Cl.
*H04M 1/00* (2006.01)
(52) U.S. Cl. .................. 455/562.1; 455/277.1
(58) Field of Classification Search ............... 455/562.1, 455/561, 277.1; 342/374
See application file for complete search history.

(56) References Cited

U.S. PATENT DOCUMENTS

| | | | |
|---|---|---|---|
| 5,907,816 A | 5/1999 | Newman et al. | |
| 5,969,689 A | 10/1999 | Martek et al. | |
| 6,323,823 B1 | 11/2001 | Wong et al. | |
| 6,462,717 B1 | 10/2002 | Wheelock et al. | |
| 6,597,927 B1 | 7/2003 | Eswara et al. | |
| 6,606,075 B1 | 8/2003 | Chun | |
| 6,801,790 B2 | 10/2004 | Rudrapatna | |
| 6,809,694 B2 | 10/2004 | Webb et al. | |
| 6,933,900 B2 | 8/2005 | Kitamori et al. | |
| 6,963,314 B2 | 11/2005 | Webb et al. | |
| 6,996,086 B2 | 2/2006 | Wolfe et al. | |
| 6,999,042 B2 | 2/2006 | Dearnley et al. | |
| 7,015,871 B2 | 3/2006 | Göttl et al. | |
| 7,053,859 B2 | 5/2006 | Jackson et al. | |

(Continued)

FOREIGN PATENT DOCUMENTS

EP    1056304    11/2000
(Continued)

OTHER PUBLICATIONS

International Search Report based on International PCT Application No. PCT/CA2006/002121.

(Continued)

*Primary Examiner* — Chandrahas Patel

(57) ABSTRACT

Wireless mesh network communication apparatus and methods are disclosed. Directional antennas are respectively operatively coupled to dedicated communication devices to provide multiple independent wireless communication links. Exchange of communication traffic through the wireless communication links provided by the communication devices and the antennas is controlled by a switch. Any or all of the antennas may be adjustable so as to provide for flexibility in antenna beam alignment. Beam alignment may be physically or electronically adjustable. Radio units including the communication devices and the antennas, and possibly also the switch, may be enclosed in a single housing. The housing may be shared with other components such as wireless communication network base station antennas.

39 Claims, 7 Drawing Sheets

U.S. PATENT DOCUMENTS

| | | |
|---|---|---|
| 7,171,223 B2 * | 1/2007 | Herscovich et al. ........... 455/500 |
| 7,680,517 B2 * | 3/2010 | Uno et al. ................... 455/562.1 |
| 7,974,658 B2 * | 7/2011 | Hunziker ....................... 455/561 |
| 2002/0167954 A1 | 11/2002 | Highsmith et al. |
| 2002/0176390 A1 | 11/2002 | Sparr et al. |
| 2003/0109217 A1 | 6/2003 | Reed et al. |
| 2004/0001442 A1 | 1/2004 | Rayment et al. |
| 2004/0174900 A1 | 9/2004 | Volpi et al. |
| 2004/0196813 A1 | 10/2004 | Ofek et al. |
| 2004/0209572 A1 | 10/2004 | Thomas |
| 2005/0030968 A1 | 2/2005 | Rich et al. |
| 2005/0074019 A1 | 4/2005 | Handforth et al. |
| 2005/0075104 A1 | 4/2005 | Jain et al. |
| 2005/0164744 A1 | 7/2005 | DuToit |
| 2006/0171402 A1 | 8/2006 | Moore et al. |
| 2006/0215605 A1 | 9/2006 | Srikrishna et al. |
| 2006/0244675 A1 | 11/2006 | Elliot et al. |
| 2006/0274745 A1 | 12/2006 | Wang et al. |
| 2007/0030208 A1 | 2/2007 | Linehan |

FOREIGN PATENT DOCUMENTS

| | | |
|---|---|---|
| EP | 1482657 | 1/2004 |
| EP | 1593210 | 11/2005 |
| WO | WO 94/26001 | 11/1994 |
| WO | WO 98/27694 | 6/1998 |
| WO | WO 98/32250 | 7/1998 |
| WO | WO 98/43363 | 10/1998 |
| WO | WO 00/51368 | 8/2000 |
| WO | WO 02/32049 | 4/2002 |
| WO | WO 03/009538 | 1/2003 |
| WO | WO 2005/015845 | 2/2005 |
| WO | WO 2006/060754 | 6/2006 |

OTHER PUBLICATIONS

International Written Opinion based on International PCT Application No. PCT/CA2006/002121.

* cited by examiner

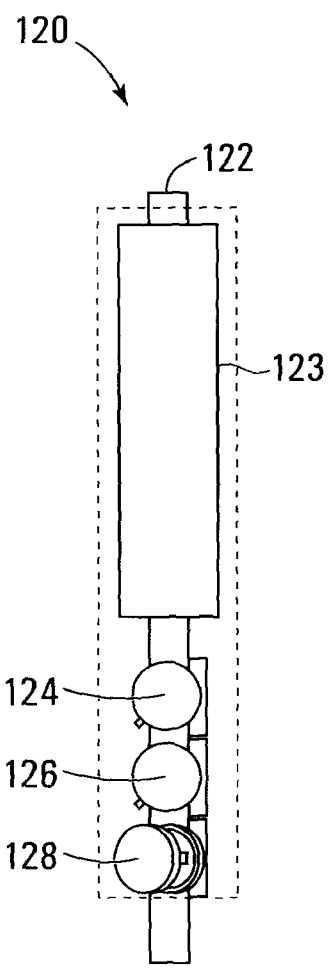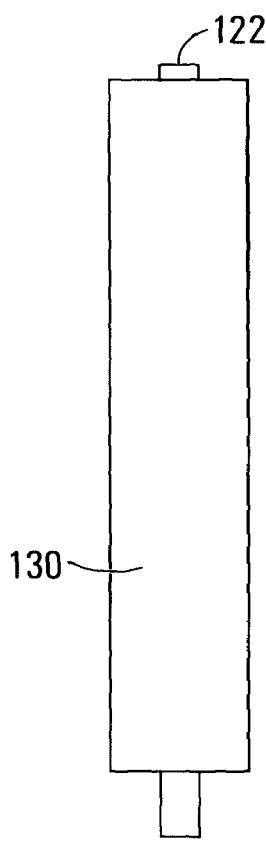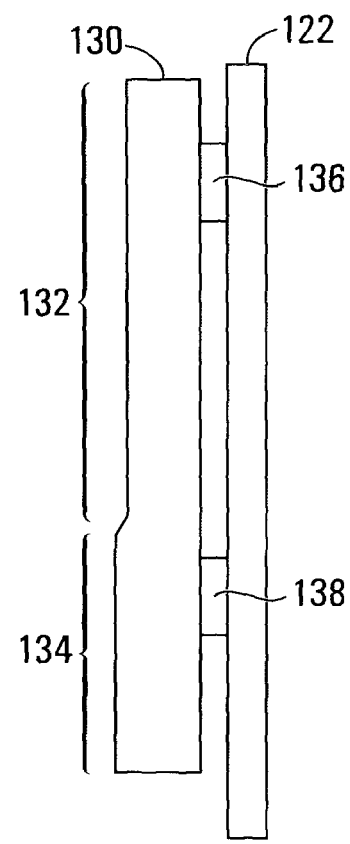
FIG. 9A   FIG. 9B   FIG. 9C

WIRELESS NETWORK COMMUNICATION APPARATUS, METHODS, AND INTEGRATED ANTENNA STRUCTURES

CROSS-REFERENCE TO RELATED APPLICATIONS

The present application is a National Phase application of, and claims the benefit of, International (PCT) Application Serial No. PCT/CA2006/002121, filed on Dec. 22, 2006, which claims priority from U.S. Provisional Patent Application Ser. No. 60/827,084, filed on Sep. 27, 2006. The entire contents of each of these related applications are incorporated herein by reference.

FIELD OF THE INVENTION

This invention relates generally to communications and, in particular, to wireless communication networks.

BACKGROUND

Mesh network technology can be used to provide a novel metropolitan communication network implementation that may achieve high bandwidth, high survivability through autonomous and self-healing operation, high availability through angle and geographic diversity, and the ability to "harden" network elements using "N+1" networking rather than the traditional "N+N" networking. High speed wireless technology allows the benefits of the mesh to be exploited while also benefiting from the cost-effectiveness and rapid deployment attributes of wireless communications.

Wireless mesh networks have two forms, including unconstrained meshes and constrained meshes. Unconstrained meshes often employ broad-beam or omni-directional antennas, which allow a given mesh node to "see" many other mesh nodes. Communication paths, which may be either primary paths or backup/re-route paths, are established with other nodes in an unconstrained manner. In this case, network routing is somewhat autonomous and as such, performance attributes such as delay, delay variability, failure re-route dead time, etc. can be somewhat unpredictable.

Constrained meshes use a restricted set of paths for primary connectivity and re-routing. A network operator or other personnel, or in some cases a control system or software, determines best paths in the mesh and enforces these paths. Delay, delay variability, failure re-route dead time, and possibly other performance attributes are therefore made more predictable.

Within the category of constrained meshes, a static array of wide-beam or sectorized antennas is typically used to form usable mesh network links between nodes. These systems sometimes use switch matrices to select antennas from the static array in order to connect radio electronics to specific antenna sectors of interest. Due to the wide-beam nature of the antennas, however, these systems do not provide high system gain or spatial rejection of interference.

An alternate approach is to use narrow-beam antennas that are oriented or aligned to form narrow beams between nodes within a mesh sub-circuit. The narrow beams allow the system to achieve such advantages as mesh network construction using point-to-point or area radio service licenses, very high capacities, individual scaling of mesh links independently of one another, very high system gain and therefore increased wireless range and high link availability, and a high degree of interference rejection.

Wireless mesh network equipment such as network nodes tends to be relatively bulky and unsightly, which can present challenges in environments where physical space is limited, or in residential locations or other deployments where aesthetics are important. Narrow-beam directional antennas offer some advantages over omni-directional or wide-beam antenna implementations as noted above, but may require a higher number of antenna elements and accordingly more physical space to provide a desired level of wireless coverage.

For example, various wireless access technologies employ sectorized antenna arrays in order to deliver service to a roughly circular coverage area where access customers or sites may exist. These antenna arrays are typically 4- or 6-sectored designs in order to fit within a larger metropolitan area coverage scheme. Some examples of these systems are cellular, Personal Communication System (PCS), and Global System for Mobile communications (GSM) mobile telephone systems, IEEE 802.11 ("WiFi") systems, IEEE 802.16 ("WIMAX") systems, and systems based on Local Multipoint Distribution Service (LMDS) or Local Multipoint Communications System (LMCS). As will be apparent to those skilled in the art of communications, IEEE 802.11 and IEEE 802.16 refer to sets of specifications that are available from the Institute of Electrical and Electronics Engineers (IEEE).

In many instances, the data and/or voice traffic in these systems is aggregated at base or hub station locations. At these locations, it is common for the traffic to be connected to one or more wireless backhaul radios for subsequent backhaul into a core network. The wireless backhaul function may be implemented using various transport technologies, such as point-to-point links for carrying Time Division Multiplexing (TDM), Synchronous Optical Network (SONET), or Ethernet traffic for instance, SONET rings, or Ethernet rings or meshes.

Wireless backhaul is traditionally implemented using backhaul radio systems that are separate network elements from access system elements and employ separate antenna systems. Backhaul radio system antennas are typically larger than access system antennas and have more highly focused beams.

In addition, an access system may be multi-functional, supporting both end user network access using area-coverage antenna systems and numerous dedicated point-to-point links for communications with other, possibly fixed, access sites such as enterprise buildings, cellular tower/building sites, etc. As with the wireless backhaul systems described above, these dedicated links may also use individual focused beams to support high bandwidth, high performance wireless communication links.

Therefore, at a given hub location, there may be numerous antennas supporting the access area coverage function and numerous other antennas supporting any of various other functions, such as point-to-point beams for wireless backhaul or links to other access sites.

In order to control the antenna counts and thus physical space requirements, various access technologies have been integrated into single sector antennas that have multiple functions. Some examples of these are dual mode cellular-PCS antennas, which include both 800-900 MHz and 1800-1900 MHz sector arrays. Another approach for conserving space, and to some degree cost, is to share other resources than antennas, such as sharing radio electronics between multiple antenna elements or wireless links. When antenna and/or radio resources are shared in this manner, however, the shared resources tend to become scarce, resulting in diminished capacity, lower survivability, and decreased availability.

Thus, there remains a need for improved network communication apparatus, techniques, and antenna structures.

SUMMARY OF THE INVENTION

According to an aspect of the invention, there is provided a communication apparatus that includes a plurality of directional antennas, a plurality of dedicated communication devices respectively operatively coupled to the plurality of antennas, and a switch, operatively coupled to the plurality of communication devices, for controlling exchange of communication traffic through wireless communication links that are provided by the plurality of communication devices and the plurality of antennas.

The plurality of antennas may include an antenna arranged for a predetermined alignment of its antenna beam.

The plurality of antennas may also or instead include an adjustable antenna for which beam alignment is adjustable to any of a plurality of directions. In this case, the apparatus may include a mounting structure for carrying the plurality of antennas, with the mounting structure including an adjustable mount for the adjustable antenna. The adjustable mount enables the adjustable antenna to be physically oriented to align its antenna beam in any of the plurality of directions.

The adjustable mount may include a plurality of pivots, with each pivot allowing the adjustable antenna to be physically oriented relative to a respective axis.

In some embodiments, the adjustable antenna is carried by its dedicated communication device, and the adjustable mount carries the dedicated communication device to thereby indirectly carry the adjustable antenna.

An adjustable antenna may be implemented as a steerable array of antenna elements, which allows the antenna beam of the adjustable antenna to be steered to any of a plurality of directions.

All of the antennas could be adjustable antennas for which antenna beam alignment is adjustable to any of a plurality of directions.

Each antenna of the plurality of antennas may have an associated operating beam width of about 10° or less, for instance.

The antennas have respective associated operating beam widths. A total of the operating beam widths of the plurality of antennas is less than 360° in some embodiments.

Where the switch is operatively coupled to a further communication link, the switch may be operable to switch communication traffic between the further communication link and the plurality of wireless communication links.

The plurality of wireless communication links may include a backhaul communication link in a wireless communication network. In this case, the switch may be further operatively coupled to an access communication link and operable to switch communication traffic between the access communication link and the backhaul communication link.

The switch is an Ethernet switch in some embodiments.

Such an apparatus may be implemented in a wireless communication network node, for example. A wireless mesh network may include a plurality of wireless communication network nodes. In a wireless mesh network, the plurality of antennas of each of the plurality of wireless communication network nodes may include at least one antenna having its antenna beam aligned with an antenna beam of an antenna of another node of the plurality of wireless communication network nodes.

A communication method is also provided, and includes receiving a communication signal at a communication apparatus over a first communication link of a plurality of communication links, the plurality of communication links comprising dedicated communication devices respectively operatively coupled to a plurality of directional antennas, determining a second communication link of the plurality of communication links over which the received communication signal is to be transmitted from the communication apparatus, and switching the received communication signal from the first communication link to the second communication link.

The method may be implemented at a wireless communication network node, and also include aligning an antenna beam of at least one antenna of the plurality of antennas with an antenna beam of an antenna of another wireless communication network node.

The operation of aligning may involve physically orienting the at least one antenna, and/or electronically steering the antenna beam.

In accordance with a further aspect of the invention, a method includes providing a plurality of radio units, each radio unit comprising a directional antenna and a dedicated communication device operatively coupled to the antenna, orienting each radio unit to align an antenna beam the antenna of the radio unit in a desired direction, and operatively coupling the plurality of radio units to a switch, the switch being for controlling exchange of communication traffic through wireless communication links that are provided by the communication devices and the antennas of the radio units.

The method may also include at least partially enclosing the radio units in a housing. Both the radio units and the switch may be at least partially enclosed in the housing.

The housing may be a multi-part housing, in which case enclosing involves assembling parts of the multi-part housing.

The operation of enclosing may involve installing the plurality of radio units in a shared housing. Such a shared housing may be for housing the radio units and further communication equipment. The further communication equipment may, for example, include a base station antenna for a base station in a wireless communication network.

In some embodiments, the method also includes mounting the plurality of radio units to an adjustable mounting structure. The adjustable mounting structure enables each radio unit of the plurality of radio units to be physically oriented to align its antenna beam in any of a plurality of directions.

According to another aspect of the invention, there is provided an antenna structure that includes a housing, a wide-beam antenna in the housing for enabling wireless communications for a first coverage area associated with an antenna beam of the wide-beam antenna, and a narrow-beam antenna in the housing for enabling wireless communications for a second coverage area associated with an antenna beam of the narrow-beam antenna. The antenna beam of the narrow-beam antenna has a beam width that is less than a beam width of the antenna beam of the wide-beam antenna.

The first coverage area may be an access area in a wireless communication network, in which case the wide-beam antenna enables access communications with access communication equipment located in the first coverage area. The wide-beam antenna may be a panel antenna, for instance.

In some embodiments, the narrow-beam antenna is for enabling communications with a fixed site in a wireless communication network over a dedicated wireless communication link. The fixed site may be a network element of the wireless communication network, and the dedicated wireless communication link may be a wireless backhaul communication link.

The narrow-beam antenna may be an antenna of a radio unit, which includes a dedicated communication device that is operatively coupled to the narrow-beam antenna and is at least partially enclosed by the housing.

An adjustable antenna for which beam alignment is adjustable to any of a plurality of directions may be implemented as the narrow-beam antenna.

The antenna structure may also include one or more further narrow-beam antennas in the housing, with each further narrow-beam antenna being for enabling wireless communications for a respective further coverage area associated with its antenna beam. The antenna beam of each further narrow-beam antenna has a beam width that is less than the beam width of the antenna beam of the wide-beam antenna.

The narrow-beam antenna and the one or more further narrow-beam antennas may include narrow-beam antennas having different beam widths.

In some embodiments, the housing includes respective housing sections for at least partially enclosing the wide-beam antenna and the narrow-beam antenna. The housing sections may differ from each other in at least one physical dimension.

Such an antenna structure may be implemented, for example, in a network element for a wireless communication network.

A network element for a wireless communication network may include multiple antenna structures. Each antenna structure may include a housing and a wide-beam antenna for enabling wireless communications for a respective one of a plurality of first coverage areas. At least one of the antenna structures further includes a narrow-beam antenna at least partially enclosed by the housing in an antenna structure as described briefly above.

A method in accordance with a still further aspect of the invention includes providing a housing, providing a wide-beam antenna for enabling wireless communications for a first coverage area associated with an antenna beam of the wide-beam antenna, and providing a narrow-beam antenna for enabling wireless communications for a second coverage area associated with an antenna beam of the narrow-beam antenna, the antenna beam of the narrow-beam antenna having a beam width that is less than a beam width of the antenna beam of the wide-beam antenna.

If the housing is a multi-part housing, providing a housing involves assembling parts of the multi-part housing.

The operation of providing a wide-beam antenna may involve providing a panel antenna as the wide-beam antenna.

The narrow-beam antenna may be provided as a radio unit that includes the narrow-beam antenna and a dedicated communication device that is operatively coupled to the narrow-beam antenna.

In some embodiments, the method also includes pro-riding one or more further narrow-beam antennas in the housing. Each further narrow-beam antenna is for enabling wireless communications for a respective further coverage area associated with its antenna beam, and the antenna beam of each further narrow-beam antenna has a beam width that is less than the beam width of the antenna beam of the wide-beam antenna.

Where multiple wide-beam antennas are provided to enable wireless communications for a plurality of first coverage areas, providing a housing may involve at least partially enclosing each wide-beam antenna in a respective lousing and at least partially enclosing the narrow-beam antenna in the housing of one of the wide-beam antennas.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail wish reference to the accompanying drawings.

FIG. 9, which includes FIGS. 9A, 9B, and 9C, is a block diagram of an example integrated antenna structure.

DETAILED DESCRIPTION OF PREFERRED EMBODIMENTS

Figure 1:
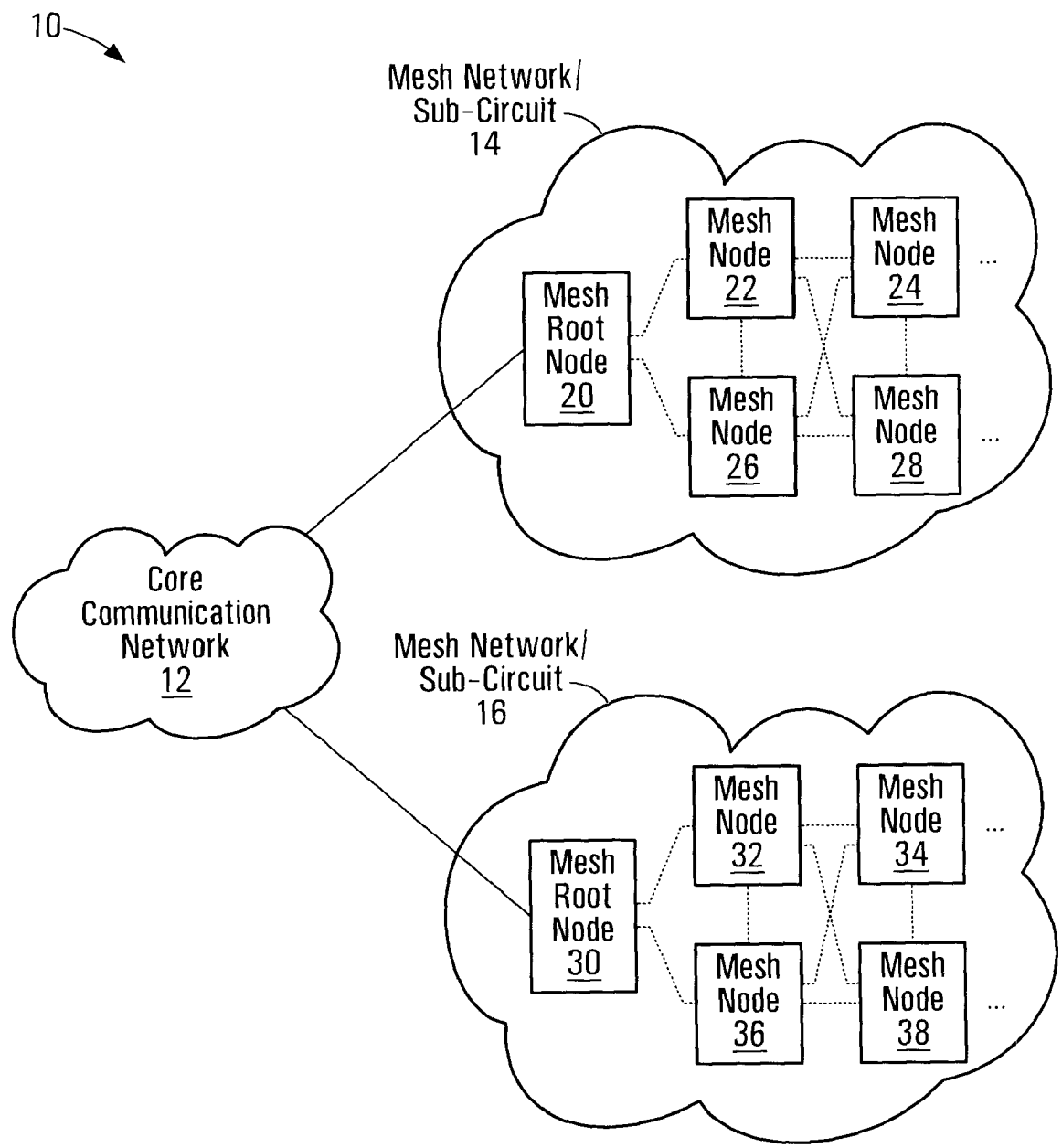
FIG. 1 is a block diagram of an example communication system.

FIG. 1 is a block diagram of an example communication system in which embodiments of the invention may be implemented. The communication system 10 of FIG. 1 includes a core communication network 12, and two mesh networks or sub-circuits 14, 16. Each of the mesh networks 14, 16 includes a mesh root node 20/30 and mesh nodes 22/32, 24/34, 26/36, 28/38. It should be appreciated that the system 10 of FIG. 1, as well as the contents of the other drawings, are intended solely for illustrative purposes, and that the present invention is in no way limited to the particular example embodiments explicitly shown in the drawings and described herein.

For example, a mesh network need not necessarily be operatively coupled to a core communication network through a single mesh root node as shown. Multiple root nodes might be provided. A mesh network could instead be implemented as a stand-alone network in which mesh nodes communicate only with other mesh nodes within that mesh network, and are not coupled to a core communication network at all. Mesh networks may also include more or fewer than four mesh nodes, possibly with a different arrangement of communication links than shown. In a constrained mesh network, for instance, the mesh nodes 24/34 might not communicate with the mesh nodes and 28/38 where mesh links are constrained to provide a maximum of two hops back to a mesh root node 20/30.

The core communication network 12 is in some embodiments a Metropolitan Area Network (MAN), which may in turn provide access to other networks such as the Internet. Those skilled in the art will be familiar with Metro networks, the Internet, and many other networks, the equipment such as switches and routers that may be used to implement networks, and their operation. The present invention is not restricted to any particular type of core communication network, equipment, or protocols, or even to implementation in conjunction with a core communication network. The core communication network 12 is thus described only briefly herein, to the extent necessary to illustrate embodiments of the invention.

The mesh root nodes 20, 30, provide access to the core communication network 12 for the mesh nodes 22/32, 24/34, 26/36, 28/38 in the mesh networks 14, 16. This type of topology might be used to expand the "reach" of the core communication network 12 into residential neighborhoods, for example, without deploying additional core network equipment in those neighborhoods.

Figure 6:
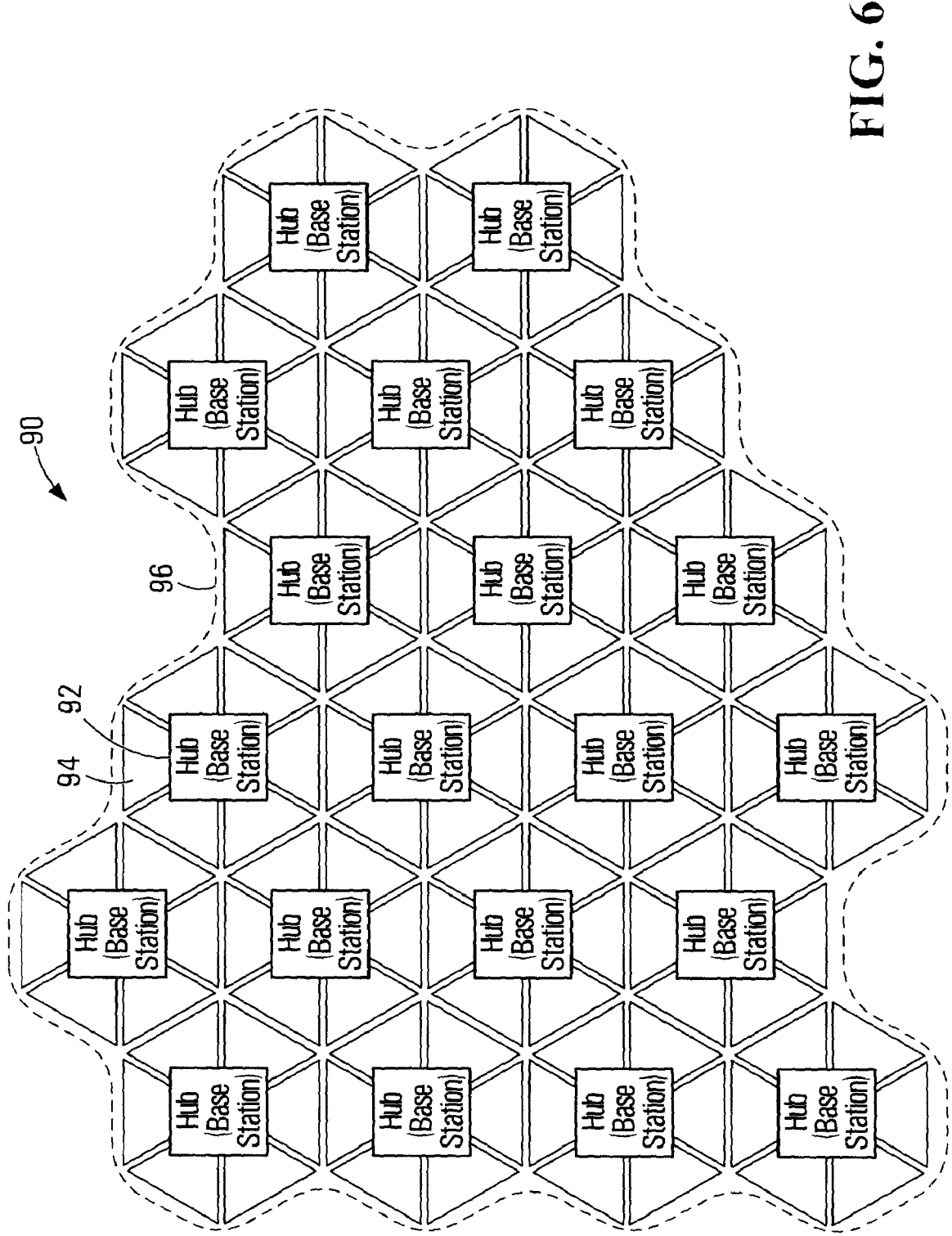
FIG. 6 is a block diagram of another example communication system showing sector access antenna beams.

According to one possible implementation, the mesh networks 14, 16 employ wireless communication links for communications between nodes. Each node may be capable of communicating with other nodes via a number of wireless links, illustratively point-to-point links established using narrow antenna beams. A node may also provide wired or wireless access links to user sites, such as shown in FIG. 6 and described below. The access links provide mesh network access and thus core network access to users. This type of implementation can be advantageous in that mesh nodes can be much less difficult and costly to deploy than core network equipment. Wireless mesh nodes can further reduce costs by avoiding the necessity to deploy wired media for backhaul to the core network 12.

The structure and operation of mesh nodes in the mesh networks 14, 16 are described in further detail below by way of illustrative example with reference to FIG. 2.

Communication links within the core communication network 12, between the core network and the mesh networks 14, 16, and within the mesh networks may include wired links over wired communication media, wireless links provided by communication devices and antennas, or some combination of wired and wireless links. In one embodiment, the core communication network 12 uses wired links, the mesh networks 14, 16 use wireless communication links between mesh nodes, and the mesh root nodes 20, 30 communicate with the coke communication network using wired links and with the mesh nodes 22/32, 26/36 using wireless links. The present invention, however, is in no way limited to this or any other combination of communication link types.

In operation, communication links are established between mesh nodes in a mesh network 14, 16 to provide a desired level of connectivity. A mesh node in an unconstrained mesh network, as described above, may be configured to communicate with any and all other mesh nodes that it can reach. In a wireless unconstrained mesh network, this would include all other mesh nodes that are within the range of the antenna(s) of a particular mesh node, i.e., the other mesh nodes that a node can "see".

Constraining mesh node connectivity may have advantages, however. Failure recovery in a constrained mesh network might be faster than in an unconstrained mesh network, since each mesh node will generally have fewer available links from which to select an alternate link in the event of a primary link failure.

In the mesh network 14, suppose the primary path from the mesh node 24 to the mesh root node 20 is through the mesh node 22. If the mesh network 14 is unconstrained, then the mesh node 24 must select one of the remaining paths, through the mesh node 26 or through both of the mesh nodes 28, 26, to re-route traffic through the mesh network to the mesh root node 20. The mesh root node 20 must also switch to an alternate path for communicating with the mesh node 24. Constraining mesh network connectivity to two hops from the mesh root node 20 can reduce alternate path selection processing in the simple mesh network 14 by half, which can significantly reduce the delay time associated with failover switching.

Processing and delay time savings can be even more pronounced in larger mesh networks that include many mesh nodes. Rapid Spanning Tree Protocol (RSTP) and Resilient Packet Ring (RPR) are examples of failover switching techniques that may be used within the mesh networks 14, 16. Depending on the number of mesh nodes and the communication link topology in a mesh network, hitless failover switching can be provided, with dead times on the order of about 100 ms or possibly less.

Configuration of a mesh network may be automatic, using a discovery mechanism to allow mesh nodes to detect each other and establish communication links, or explicit. Explicit network configuration may involve a manual process in which a network administrator or other personnel manually configures communication links between mesh nodes. A combined configuration scheme is also possible, where mesh nodes can discover each other but an administrator must manually establish links, or at least approve automatic establishment of specific links, between mesh nodes as nodes are discovered.

Figure 2:
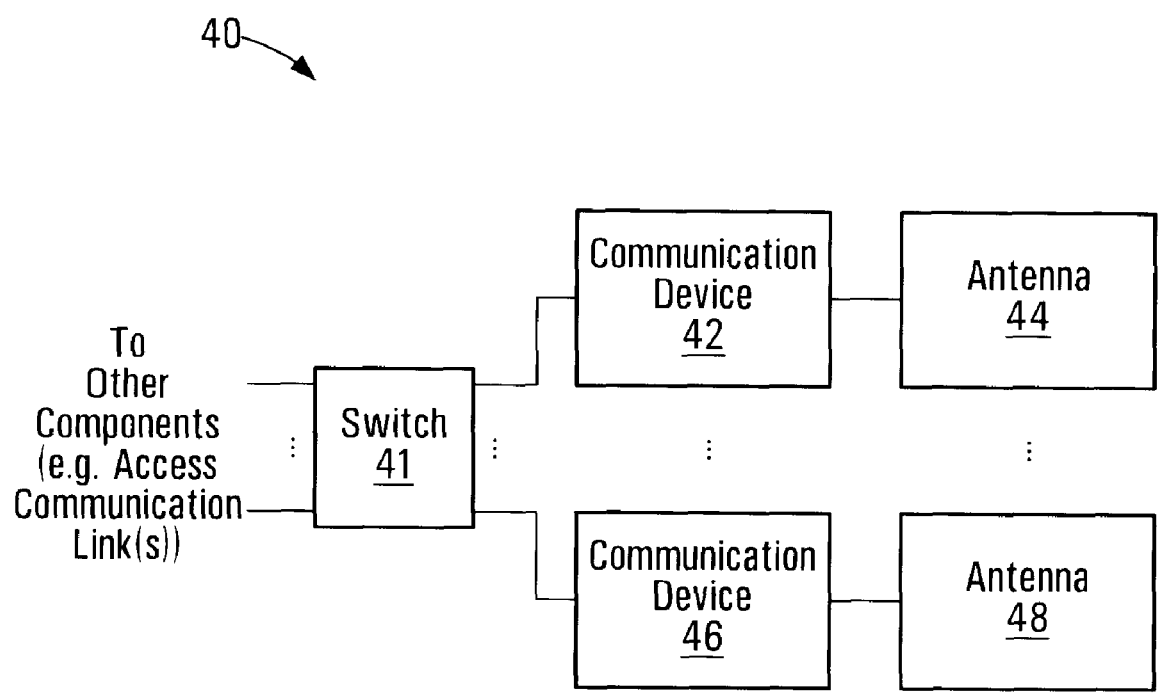
FIG. 2 is a block diagram of an example communication apparatus.

FIG. 2 is a block diagram of an example communication apparatus according to an embodiment of the invention. The apparatus 40 includes a switch 41, communication devices 42, 46 operatively coupled to the switch 41, and antennas 44, 48 operatively coupled to the communication devices. The antennas 44, 48, and the dedicated communication devices coupled thereto, provide respective wireless communication links. As indicated in FIG. 2, an apparatus 40 may include more than two communication devices and antennas, where more than two wireless communication links are to be supported.

It should be appreciated that the block diagram shown in FIG. 2 is intended solely for illustrative purposes. Embodiments of the invention may be implemented using further, fewer, or different blocks than explicitly shown. Although a single switch element is shown in FIG. 2, for instance, switching arrangements including multiple devices and/or other traffic routing or control arrangements may be used in some embodiments. Similarly, each antenna 44, 48 may include one antenna element or multiple antenna elements, as in the case of an array antenna. Further variations may be or become apparent to those skilled in the art.

The switch 41 may be connected to other components than the communication devices 42, 46, such as communication traffic processing components, other communication links such as wired and/or wireless access communication links or a link to a core network in the case of a mesh root node, etc. In one embodiment, the switch 41 is an Ethernet switch that switches communication traffic between wireless network links, provided by the communication devices 42, 46 and the antennas 44, 48, and access links (not shown). Components that support these communication links may be coupled to different ports of the switch 41, for example. Those skilled in the art will be familiar with many examples of such switching devices or switching arrangements.

Each communication device 42, 46 enables communication traffic, and possibly other information such as control information, to be communicated wirelessly through its antenna 44, 48. A communication device may enable wireless reception, transmission, or both reception and transmission of signals. The specific structure of the communication devices 42, 46 may vary depending upon the wireless communication protocol(s) to be supported, for example. Functions such as frequency conversion, coding and/or decoding, modulation and/or demodulation, gain control, etc., are common in communication devices but implemented in different ways for different types of wireless links. The present invention is not limited to any specific type of wireless link, and accordingly embodiments of the invention may be used in conjunction with any of many types of communication devices.

The communication devices 42, 46 may, but need not necessarily, all be of the same type. The switch 41 may switch signals between wireless network links and wireless access links, for example, with the network and access link devices being of different types.

The antennas 44, 48 may similarly include any of many different types of antennas. According to one embodiment, each antenna 44, 48 is a directional narrow-beam antenna. In terms of structure, planar antenna elements and sets of antenna elements in respective arrays are examples of possible implementations of the antennas 44, 48. These antennas, other antenna types, or any combinations thereof, may be used as the antennas 44, 48 in the apparatus 40.

In general, communication signals, which may include communication traffic and/or control information for example, are received at the switch 41 over a communication link. The switch 41 or another component such as a switching control device or system determines an output link over which each received signal is to be transmitted from the apparatus 40. This determination may be made on the basis of address information in the received signals, for instance, as will be apparent to those skilled in the art. The links on which a signal is received and is to be transmitted may be access links, network links in the case of signals traversing a network, or a combination of an access link and a network link. The switch 41 thus controls the exchange of communication traffic, and possibly other types of signals, through the wireless communication links provided by the devices 42, 46 and the antennas 44, 48.

These and other operations that may be involved in processing of signals at network nodes or other installations of the apparatus 40 will be familiar to those skilled in the art. Implementation of embodiments of the invention need not necessarily affect the manner in which signals are routed through a network. However, providing respective dedicated communication devices 42, 46 for each of multiple antennas 44, 48 as shown in FIG. 2 can provide advantages over conventional wireless equipment designs. In the apparatus 40, multiple independent wireless communication links are provided. Neither communication device resources nor antenna resources are shared between wireless links, which can improve capacity, reliability, and survivability relative to shared-resource equipment.

According to one embodiment, each communication device 42, 46 includes a point-to-point radio, and each antenna 44, 48 is a directional antenna having an antenna beam width of about 10° or less. Each beam is oriented through a mechanical or electronic mechanism to form an aligned path and thus a wireless communication link to a respective far end apparatus. The antennas 44, 48 may be arranged for a predetermined fixed alignment of antenna beams relative to each other in the apparatus 40. However, any or all of the antennas 44, 48 may be adjustable, so that antenna beams may be aligned to any of a number of directions.

Figure 3:
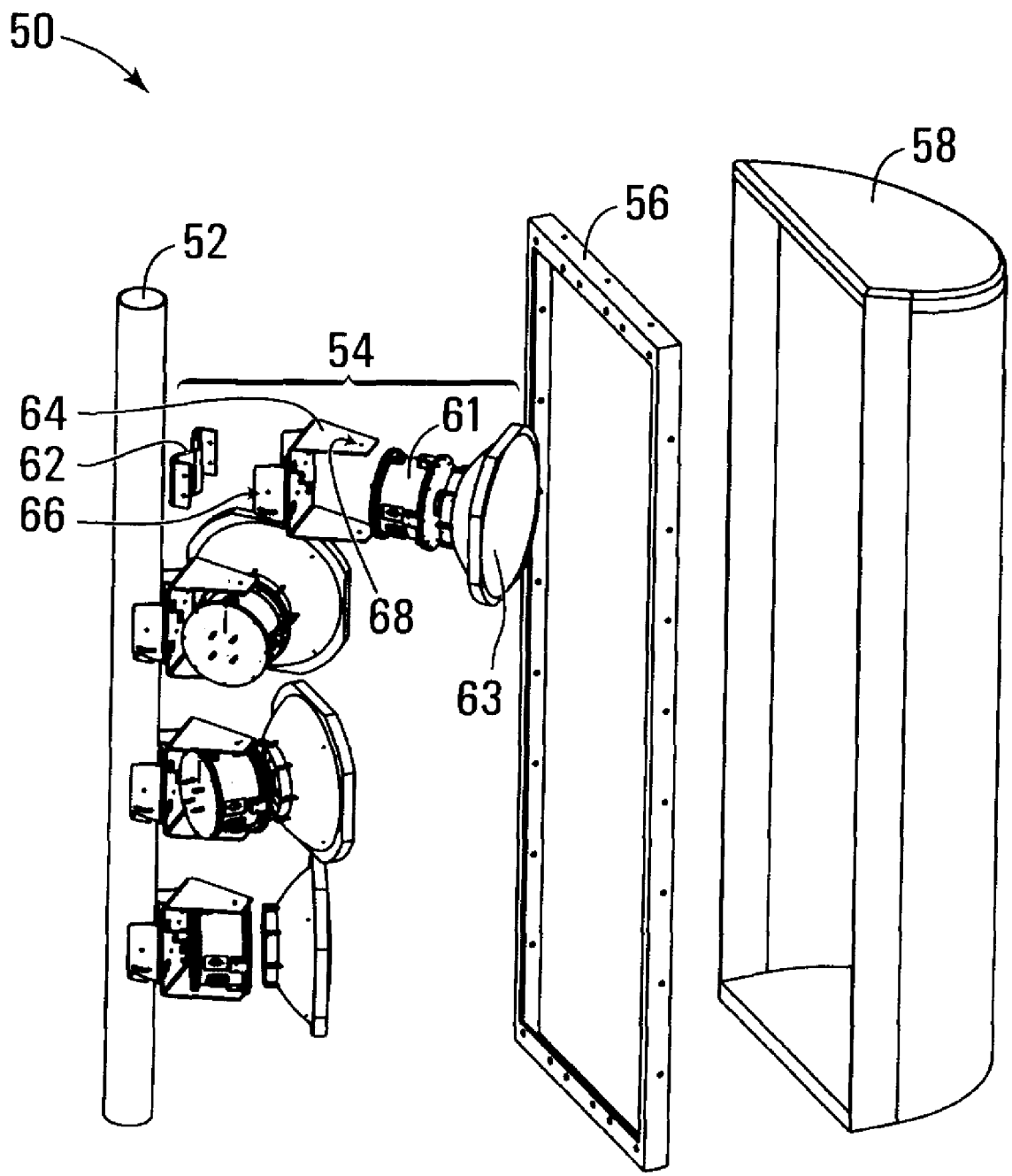
FIG. 3 is a block diagram of an example implementation of a communication apparatus and housing.

The alignment of antenna beams can be achieved through a mechanical arrangement that provides for physical beam alignment. An example of such a physical alignment arrangement is shown in FIG. 3 and described in further detail below. An electronically steerable antenna array such as a phased array could be used to provide beam steering and thus alignment under software or electronic control. Different types of alignment control system may be provided for different ones of the antennas 44, 48.

It should be appreciated that an apparatus may include a combination of fixed and adjustable antennas, although an apparatus having only adjustable antennas might provide the most flexibility in that the same apparatus can be configured for operation in a variety of locations. Beams can then be aligned in one pattern relative to each other in one location, and in a different pattern in another location. Adjustable antennas would also permit re-alignment of beams as new nodes are added to a mesh network or existing nodes are relocated or removed from a mesh network.

Another potential advantage of deploying one or more adjustable antennas is that a full 360° range of coverage can be provided with narrow-beam antennas. Even though each antenna might have a narrow operating beam width, which in the case of an array antenna would be the width of the beam while the antenna is actually in use, and the total of the operating beam widths may be less than 360°, the antennas can be adjusted to any desired direction.

FIG. 3 is a block diagram of an example implementation of a communication apparatus and housing. The arrangement 50 includes an elongate member 52, radio units 54, a housing mount 56, and a housing 58. This represents one example of the basic idea of integrating communication device electronics and antennas into a single, field-mountable assembly. Other mounting, integration, and housing arrangements than those explicitly shown in FIG. 3 are also contemplated, and may be or become apparent to hose skilled in the art.

The member 52 is part of a mounting structure for carrying antennas. In the illustrated example, the mounting structure also includes adjustable mounts, each of which includes a bracket 62 for attachment to the member 52, and a bracket 64 for attachment to the bracket 62. Screws, nuts/bolts, rivets, clamps, and friction fit are examples of possible attachment types, although other types of attachments may be used to connect the bracket 62 to the member 52, and to connect the bracket 64 to the bracket 62.

As shown, the bracket 64 includes one portion for connection to the bracket 62, and another portion for carrying an antenna. The arrangement 50 clearly shows that a mounting structure need not necessarily carry an antenna directly. Where the antennas 63 are carried by the communication devices 61 or these components are otherwise integrated into radio units, the adjustable mounts may carry the communication devices and thus, indirectly, carry the antennas.

Any of various attachment types may be used to attach antennas or radio units to the brackets 64, including screws, nuts/bolts, rivets, clamps, and friction fit, among others. In one embodiment, a radio unit that includes a communication device 61 and an antenna 63 includes pins or other protrusions that are received in holes 68 in the bracket 64. This combination provides a pivot for allowing the radio unit and thus the antenna to be physically oriented relative to an axis that passes through the pivot, in a "side-to-side" direction in FIG. 3.

A similar arrangement may be provided between the brackets 62, 64 via the holes 66, to allow the antenna 63 to be oriented about another axis.

In some embodiments, a releasable or removable attachment may be provided for attaching the bracket 62 to the member 52, to allow entire radio units to be moved in a direction along the member and/or around the member.

The arrangement 50 may be manufactured as a substantially complete unit in which the radio units, and possibly also a switch as shown in FIG. 2, are at least partially enclosed in the housing 58. The housing could be removed in the field so as to allow antenna beams to be aligned in desired directions, and then reinstalled. In the example shown, the housing mount 56 may be attached to a wall or other supporting structure, which then effectively forms part of the housing, and the housing 58 is attached to the housing mount. The member 52 may be attached to the housing 58, the housing mount, or the supporting structure in this case.

Where a switch is to be deployed outside the housing 58, the switch might be operatively coupled to the radio units 54 before or after the housing is installed. For an internally deployed switch, this coupling would generally be made before the housing 58 is installed. In order to avoid overly complicating the drawing, connections between the radio units 54 and other communication components such as a switch have not been explicitly shown in FIG. 3.

It should be appreciated that other forms of housings are also contemplated, including housings that substantially enclose radio units independently of any wall or supporting structure. Such a housing might be provided as a multi-part housing that is assembled around the radio units 54. Instead of a housing mount 56, this type of housing might include a solid planar or shaped housing section that is designed to mate with the housing section 58. Again, the housing may be disassembled to allow the radio units and thus the antennas 63 to be oriented for desired beam alignments.

A housing for a wireless mesh node might be a shared housing that encloses other components, such as other communication equipment. In one embodiment, wireless mesh nodes provide wireless backhaul to a core communication network, and access links are provided through a cellular base station. The radio units and mounting structure could then be installed in the same housing as the base station antenna(s). This aspect of the invention is described in further detail below.

Figure 4:
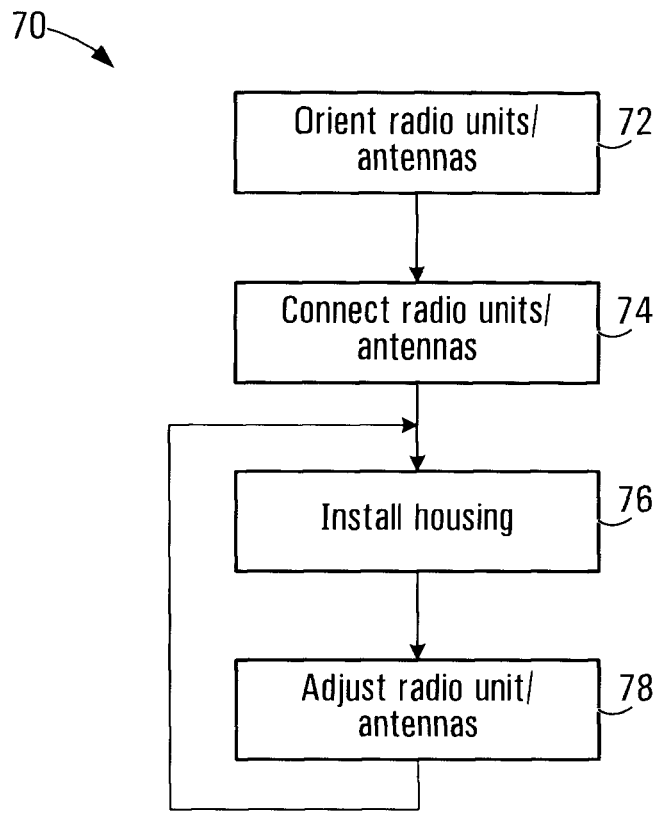
FIG. 4 is a flow diagram showing an example method of manufacturing and/or using a communication apparatus.

Embodiments of the invention have been described above primarily in the context of systems or apparatus. FIG. 4 is a flow diagram showing an example method of manufacturing and/or using a communication apparatus. Although the operations shown in FIG. 4 have been introduced briefly above with reference to FIG. 3, the method 70 is explicitly illustrated in the form of a flow chart in FIG. 4 for clarity.

As shown, a method 70 according to an embodiment of the invention may involve an operation 72 of orienting antennas, which may be provided as radio units that include directional antennas and dedicated communication devices operatively coupled to the antennas. The radio units or antennas are oriented to align an antenna beam of each antenna to a desired direction.

The radio units or antennas are then connected, to a switch for instance, at 74. As described above, the switch may be provided for controlling exchange of communication traffic through wireless communication links that are supported by communication devices and the antennas.

At 76, a housing is installed to at least partially enclose the antennas. In some embodiments, the housing encloses other components, such as complete radio units, a switch that is operatively coupled to the radio units or antennas, and/or other antennas as described in further detail below. Installation of the housing at 76 may involve attaching the housing to another structure or assembling housing parts, for example.

As shown at 78, installation of the housing at 76 does not necessarily preclude further adjustment of the orientation of adjustable radio units or antennas. The housing might be removed, or partially or entirely disassembled, while the radio units or antennas are re-oriented. The housing can then be re-installed after adjustments are complete. In some embodiments, a housing may provide access for such adjustments without removing or disassembling the housing. A housing might incorporate an access door or uncovered access opening, for example. It should therefore be appreciated that a housing need not completely cover or enclose an antenna, although in most implementations complete enclosure of radio units or antennas may generally be preferred. References to various components being located in a housing should be interpreted accordingly.

The method 70 is representative of an example of a method according to one embodiment of the invention. Other embodiments may include further, fewer, or different operations that are performed in a similar or different order. For example, radio units/antennas might be connected to other components before they are oriented to provide a particular beam alignment. Where a housing provides an access door or opening, the housing could be installed before the radio units/antennas are oriented and/or connected.

It should also be appreciated that such a method may be performed by different parties or entities. A manufacturer of an antenna structure, for example, might connect radio units/antennas and orient them in some arbitrary or default direction(s) and temporarily install a housing. During deployment, radio units/antennas could then be reoriented by field personnel employed by a network operator or service provider. Various components could also be sold separately and assembled in the field.

Further variations of the method 70 may be or become apparent to those skilled in the art.

Figure 5:
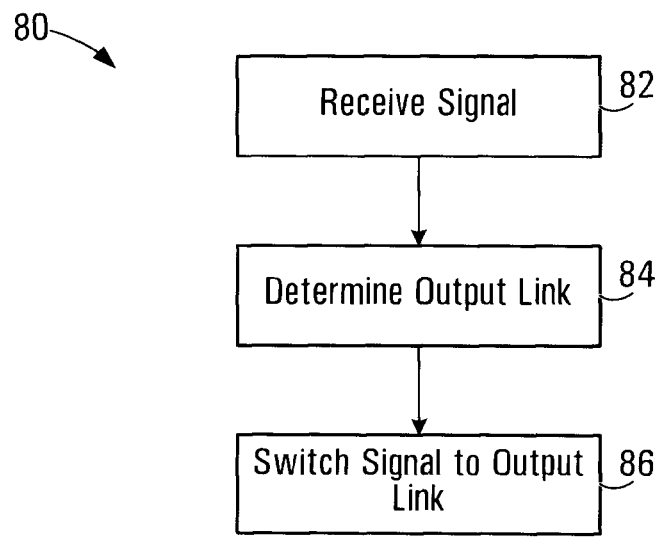
FIG. 5 is a flow diagram illustrating an example communication method.

FIG. 5 is a flow diagram illustrating a communication method according to another embodiment of the invention.

In the method 80, a communication signal is received at a communication apparatus over a first communication link, at 82. This communication link may be one of multiple communication links, which include dedicated communication devices that are respectively operatively coupled to directional antennas and may also include one or more other links. At 84, a determination is made as to a second one of the multiple communication links over which the received communication signal is to be output and transmitted from the communication apparatus. The received communication signal is switched from the first communication link to the second, output communication link at 86.

The method 80 may be implemented, for instance, at a wireless communication network node. Antenna beams may be aligned between the node and one or more other nodes in the network by physically orienting antennas at the nodes or electronically steering the antenna beams, for example. The aligned beams provide wireless communication links to and/or from which communication signals may be switched.

As noted above, radio units or antennas may be housed in a shared housing that also at least partially encloses other components. According to an aspect of the invention, point-to-point antennas having focused narrow beams are integrated with sector access antennas into a single antenna housing. This reduces the number of different antenna assembly enclosures that would otherwise be required for sector beams that provide area coverage and for focused beams.

The focused beams may be aligned or pointed in desired directions mechanically or electrically, as described in detail above. Mechanical alignment may be provided through adjustable mounts and electronic alignment may use phased arrays, for instance.

Several possible applications of sector access beams and more highly focused beams can be appreciated from FIG. 6, which is a block diagram of another example communication system showing such sector access antenna beams. The wireless communication system 90 includes a collection of hubs or base stations 92. Area access coverage is provided at each hub or base station 92 by respective wide-beam sector antennas that support wireless communications in coverage areas 94. Those skilled in the art will readily appreciate that each coverage area 94 is covered by a sector antenna beam. An overall coverage area of the wireless communication system is shown at 96.

As will be apparent, for example, from FIG. 1 and the corresponding description thereof, the system 90 may be implemented in conjunction with other components that have not been specifically shown in FIG. 6. For example, one or more of the hubs or base stations 92 may also be operatively coupled, via wired and/or wireless links, to a core communication network. The system 90 might be implemented as a mesh network 14, 16 of the system 10 in FIG. 1, For instance.

More generally, the system 90 of FIG. 6 should be considered as an illustrative example of a communication network in conjunction with which embodiments of the invention may be implemented. Other communication networks or systems may include more or fewer hub or base station locations than shown, which are interconnected with each other and/or with other components in a similar or different way. Per-sector coverage areas may similarly vary from the specific numbers and shapes shown in FIG. 6. Coverage areas are typically not nearly as well-defined as represented in FIG. 6, for example.

The structure and operation of communication equipment at the hubs or base stations 92 will be dependent to at least some extent on the transfer mechanisms and protocols used for access communications with user access equipment (not shown) that is located within the coverage areas 94 and for network communications between different hubs or base stations 92 or between hubs or base stations 92 and other network components (not shown). A hub or base station 92 may have a structure as shown generally in FIG. 2, with sector access antennas and access communication devices also being operatively coupled to the switch 41, for example.

Figure 7:
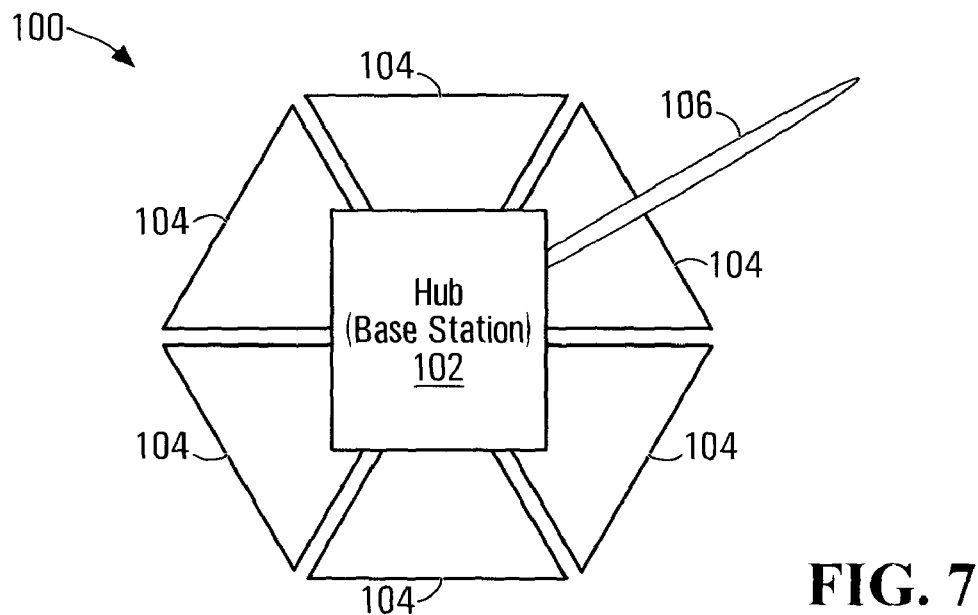
FIG. 7 is a block diagram showing an example beam pattern including sector access antenna beams and a focused antenna beam.

Whereas FIG. 1 primarily shows network communication links between mesh nodes in the mesh networks 14, 16 and FIG. 6 shows sector access areas or beams 94 that support access communication links through which the hubs or base stations 92 communicate with end user equipment (not shown), it will be appreciated that communication networks typically include both types of links. FIG. 7 is a block diagram showing an example beam pattern 100 at a hub or base station 102, including both sector access antenna beams 104 and a focused antenna beam 106.

For ease of description, reference is made to beams 104 and 106. These beams enable wireless communications in respective coverage areas. The sector antenna access beams 104 are associated with respective wide-beam antennas and provide area coverage for an access area such as shown in FIG. 6. A narrow-beam antenna has a focused antenna beam 106, and might provide a point-to-point link for wireless backhaul, as shown in FIG. 1, or for an access connection to a fixed access site, for example. Often, different types of antennas are used for sector access beams 104 and focused beams such as 106, and area access antennas are typically located and housed separately from each other and from focused-beam antennas.

As shown, the area access beams 104 are substantially wider than the focused beam 106. In one embodiment, each sector access beam 104 has a beam width of about 60°, and the focused beam 106 has a beam width of less than about 10°. It should be appreciated, however, that these beam widths are examples only. In general, an antenna beam associated with a narrow-beam antenna has a beam width that is less than that of a wide-beam antenna. Beam widths in this context are the operating beam widths exhibited by the antennas during operation.

Figure 8:
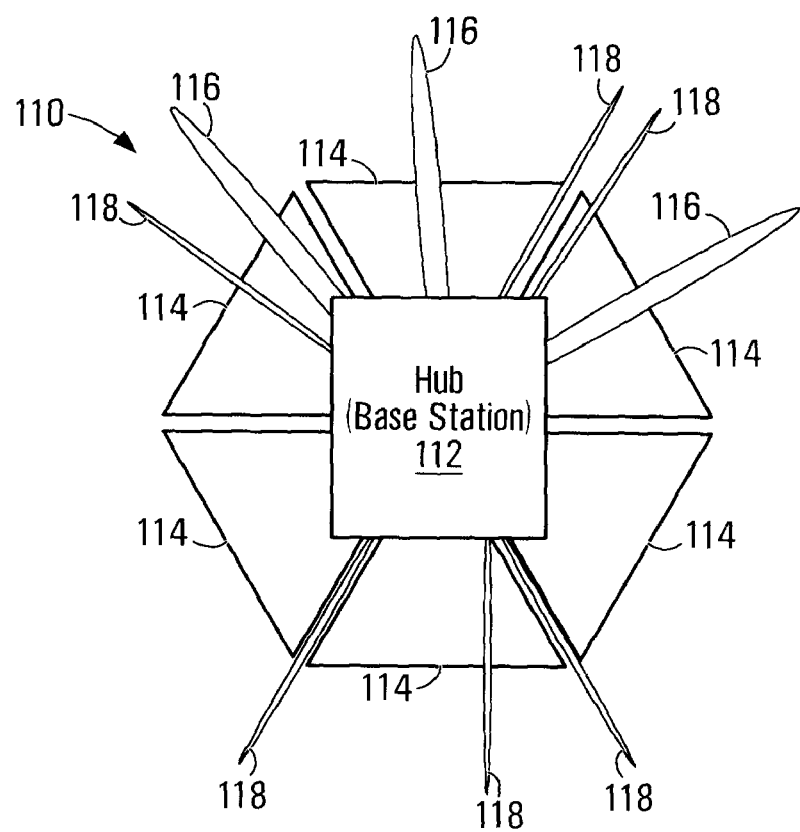
FIG. 8 is a block diagram showing another example pattern of sector and focused antenna beams.

FIG. 8 is a block diagram showing another example pattern of sector and focused antenna beams, and might be more closely representative of beams patterns that may be provided in actual implementations of wireless communication systems. The beam pattern 110 at a hub or base station 112 includes sector access beams 114, and two different types 116, 118 of focused beams. In one embodiment, the beams 115 are provided for wireless backhaul, and the more highly focused beams 118 provide dedicated access links to other fixed access sites. Each sector beam 114 and each focused beam 116, 118 could be provided using a respective antenna that includes one or more antenna elements. At least the focused beams 116, 118 may be mechanically or electronically alienable.

Each hub or base station 92, 102, 112, as noted above, may have a structure as shown in FIG. 2, with the addition of access link antennas and associated components operatively coupled to the switch 41. Examples of focused beam antennas and their alignment and operation have been described in detail above. Those skilled in the art will be familiar with many different area access technologies, and any one or more of these could be used to provide access links at a hub or base station 92, 102, 112. Integration of area access antennas and focused beam antennas into the same housing does not necessarily affect the actual operation of those antennas, and accordingly the description below concentrates primarily on physical aspects of integrated antenna structures and housings.

FIG. 9 is a block diagram of an example integrated antenna structure. FIGS. 9A and 9B are front views of the antenna structure 120 with its housing removed and installed, respectively, and FIG. 9C is a side view of the antenna structure.

The antenna structure 120 includes a sector antenna 123, which in the example shown is provided in the form of a type of antenna that is also sometimes referred to as a sector "panel", and three point-to-point narrow-beam antennas 124, 126, 128, mounted to an elongate member 122. A single housing 130 is shown in FIGS. 9B and 9C, but is shown only in outline in FIG. 9A so as to illustrate internal details of the antenna structure 120.

In the example shown, the antennas 124, 126, 128 are provided as part of mechanically alignable radio units. Other embodiments, however, may employ antennas that are directly mounted to the member 122. Another possible variation would be to provide the antennas 124, 126, 128 as electronically alignable array antennas of single or potentially multiple-beam designs. Thus, references herein to antennas should be interpreted as including antennas having multiple antenna elements.

Both the wide-beam area coverage antenna 123 and the narrow-beam antennas 124, 126, 128 are at least partially enclosed by the single housing 130. As shown most clearly in FIG. 9C, the housing 130 may, but need not necessarily, include respective sections 132, 134 of different sizes for housing the wide-beam area coverage antenna 123 and the narrow-beam antennas 124, 126, 128. The sections 132, 134 of the housing 130 have different lengths and depths in the example shown. Other dimensions of a housing may also or instead vary between different housing sections. More generally, housing sections may differ from each other in one or more physical dimensions.

The antennas 123, 124, 126, 128 may be mounted to the member 122 using any of various types of structural components. Adjustable mounts as shown in FIG. 3, for example, may be used to mount the narrow-beam antennas 124, 126, 128 to the member 122. A fixed mount might be used for the sector antenna 123. Any or all of the antennas may instead be mounted to the housing 130, which is in turn mounted to the member 122, using brackets 136, 138 for instance.

A key benefit of this integration aspect of the present invention is that a wireless network operator would not require such a large number of antenna enclosure assemblies to support different functions. For example, an assembly as shown in FIG. 9 may function as a sector antenna, such as for 1800-1900 MHz PCS or 2.5 GHz WiMax, and also provide one or more focused links for communications with other sites, such as for backhaul and/or fixed access. One antenna structure 120 could be deployed per sector at a hub or base station location, for example. Instead of having separate housings for each sector antenna and for each narrow-beam backhaul or dedicated access link for instance, only one antenna housing could be provided per sector. For the six-sectored hub or base station 112 of FIG. 8, only 6 shared antenna housings, instead of 15 separate housings, would be deployed.

FIG. 9, like the other drawings, represents one possible implementation of an aspect of the invention. Other embodiments may include variations from the specific arrangement shown. For example, a housing may be mounted to a wall or other structure than the member 122. A housing could also or instead carry a member such as 122, to which antennas are mounted, and itself be mounted to another member or structure. The numbers and/or types of antennas may also be different than shown. In general, one or more wide-beam antennas, such as sector antennas or an omni-directional antenna, and one or more narrow-beam antennas are housed in a single housing.

Variations in the exact size and/or form of the housing structure are also expected. A housing may be a one-piece unit or a multiple-piece unit that is assembled around the antennas, for example, to at least partially, but not necessarily entirely, enclose at least the antennas. As noted above, other components are also at least partially enclosed, with the antennas, by a housing in some embodiments.

The antenna integration aspect of the present invention may also be embodied in methods of manufacturing and/or using an antenna structure. With reference to FIG. 4, for example, such a method might include connecting wide-beam antennas and narrow-beam antennas to other components, illustratively to radios and a switch, as shown at 74, and installing a housing to at least partially cover the antennas at 76. The narrow beam antennas are adjustable in some embodiments, and accordingly those antennas might also be oriented and possibly adjusted as shown at 72, 78.

What has been described is merely illustrative of the application of principles of embodiments of the invention. Other arrangements and methods can be implemented by those skilled in the art without departing from the scope of the present invention.

I claim:

1. A communication apparatus comprising:
a plurality of directional antennas;
a plurality of dedicated communication devices respectively operatively coupled to the plurality of antennas, the plurality of antennas comprising an adjustable antenna for which beam alignment is adjustable to any of a plurality of directions;
a switch, operatively coupled to the plurality of communication devices, for controlling exchange of communication traffic through wireless communication links that are provided by the plurality of communication devices and the plurality of antennas; and
a mounting structure for carrying the plurality of antennas, the mounting structure comprising an adjustable mount for the adjustable antenna, the adjustable mount enabling the adjustable antenna to be physically oriented to align its antenna beam in any of the plurality of directions, the adjustable mount comprising a plurality of pivots, each pivot allowing the adjustable antenna to be physically oriented relative to a respective axis.

2. The apparatus of claim 1, wherein the plurality of antennas further comprises an antenna arranged for a predetermined alignment of its antenna beam.

3. The apparatus of claim 1, further comprising:
an access antenna; and
an access communication device operatively coupled to the access antenna and to the switch, the switch further controlling exchange of communication traffic between the wireless communication links and an access communication link that is provided by the access communication device and the access antenna.

4. The communication apparatus of claim 1, further comprising:
a wide-beam antenna for enabling wireless communications for a first coverage area associated with an antenna beam of the wide-beam antenna,
each directional antenna of the plurality of directional antennas enabling wireless communications for a second coverage area associated with an antenna beam of the directional antenna, the antenna beam of each directional antenna having a beam width that is less than a beam width of the antenna beam of the wide-beam antenna.

5. A network element for a wireless communication network, the network element comprising:
the communication apparatus of claim 4.

6. The apparatus of claim 1, wherein the adjustable antenna is carried by its dedicated communication device, and wherein the adjustable mount carries the dedicated communication device to thereby indirectly carry the adjustable antenna.

7. The apparatus of claim 1, wherein the adjustable antenna comprises a steerable array of antenna elements, the steerable array allowing the antenna beam of the adjustable antenna to be steered.

8. The apparatus of claim 1, wherein each antenna of the plurality of antennas comprises an adjustable antenna for which antenna beam alignment is adjustable to any of a plurality of directions.

9. The apparatus of claim 1, wherein each antenna of the plurality of antennas has an associated operating beam width of about 10° or less.

10. The apparatus of claim 1, wherein each antenna of the plurality of antennas has an associated operating beam width, and wherein a total of the operating beam widths of the plurality of antennas is less than 360°.

11. The apparatus of claim 1, wherein the switch is operatively coupled to a further communication link, and wherein the switch is operable to switch communication traffic between the further communication link and the plurality of wireless communication links.

12. The apparatus of claim 1, wherein the plurality of wireless communication links comprises a backhaul communication link in a wireless communication network, and wherein the switch is further operatively coupled to an access communication link and is operable to switch communication traffic between the access communication link and the backhaul communication link.

13. The apparatus of claim 1, wherein the switch comprises an Ethernet switch.

14. A wireless communication network node comprising: the apparatus of claim 1.

15. A wireless mesh network comprising:
a plurality of wireless communication network nodes as claimed in claim 14.

16. The wireless mesh network of claim 15, wherein the plurality of antennas of each of the plurality of wireless communication network nodes comprises at least one antenna having its antenna beam aligned with an antenna beam of an antenna of another node of the plurality of wireless communication network nodes.

17. The communication apparatus of claim 4, further comprising:
a housing, the housing comprising respective housing sections for at least partially enclosing the wide-beam antenna and the plurality of directional antennas, the respective housing sections differing from each other in at least one physical dimension.

18. The communication apparatus of claim 4, wherein the first coverage area comprises an access area in a wireless communication network, the wide-beam antenna being for enabling access communications with access communication equipment located in the first coverage area.

19. The communication apparatus of claim 4, wherein the wide-beam antenna comprises a panel antenna.

20. The communication apparatus of claim 4, wherein the plurality of directional antennas comprises a directional antenna for enabling communications with a fixed site in a wireless communication network over a dedicated wireless communication link.

21. The communication apparatus of claim 20, wherein the fixed site comprises a network element of the wireless communication network, and wherein the dedicated wireless communication link comprises a wireless backhaul communication link.

22. The communication apparatus of claim 4, wherein each of the directional antennas comprises an antenna of a respective radio unit, each radio unit comprising one of the directional antennas and the dedicated communication device that is operatively coupled to the directional antenna, the communication apparatus further comprising:
a housing, the radio units being at least partially enclosed by the housing.

23. The communication apparatus of claim 4, wherein plurality of directional antennas comprises narrow-beam antennas having different beam widths.

24. A communication method comprising:
receiving a communication signal at a wireless communication network node over a first communication link of a plurality of communication links, the plurality of communication links comprising dedicated communication devices respectively operatively coupled to a plurality of directional antennas;
determining a second communication link of the plurality of communication links over which the received communication signal is to be transmitted from the wireless communication network node;
switching the received communication signal from the first communication link to the second communication link;
aligning an antenna beam of at least one antenna of the plurality of antennas with an antenna beam of an antenna of another wireless communication network node, the aligning comprising electronically steering the antenna beam.

25. The method of claim 24, wherein the dedicated communication devices respectively operatively coupled to a plurality of directional antennas comprise respective radio units, each radio unit comprising one of the directional antennas and the dedicated communication device operatively coupled to the antenna.

26. The method of claim 25, further comprising:
providing an access radio unit, the access radio unit comprising an access antenna and an access communication device operatively coupled to the access antenna; and
at least partially enclosing the plurality of radio units and the access radio unit in a housing.

27. The method of claim 25, further comprising:
mounting the plurality of radio units to an adjustable mounting structure, the adjustable mounting structure enabling each radio unit of the plurality of radio units to be physically oriented to align its antenna beam in any of a plurality of directions.

28. The method of claim 25, further comprising:
at least partially enclosing the radio units in a housing.

29. The method of claim 28, wherein the housing comprises a multi-part housing, and wherein enclosing comprises assembling parts of the multi-part housing.

30. The method of claim 28, wherein enclosing comprises installing the plurality of radio units in a shared housing, the shared housing being for housing the radio units and further communication equipment.

31. The method of claim 30, wherein the further communication equipment comprises a base station antenna for a base station in a wireless communication network.

32. A method comprising:
providing a housing;
providing a wide-beam antenna in the housing for enabling wireless communications for a first coverage area associated with an antenna beam of the wide-beam antenna; and
providing a narrow-beam antenna in the housing for enabling wireless communications for a second coverage area associated with an antenna beam of the narrow-beam antenna, the antenna beam of the narrow-beam antenna having a beam width that is less than a beam width of the antenna beam of the wide-beam antenna,
wherein providing a narrow-beam antenna comprises providing in the housing a radio unit comprising the narrow-beam antenna and a dedicated communication device that is operatively coupled to the narrow-beam antenna,
wherein the narrow-beam antenna and the dedicated communication device provide a backhaul communication link, wherein providing a wide-beam antenna comprises providing in the housing an access radio unit comprising the wide-beam antenna and an access communication device that is operatively coupled to the wide-beam antenna.

33. The method of claim 32, wherein the housing comprises a multi-part housing, and wherein providing a housing comprises assembling parts of the multi-part housing.

34. The method of claim 32, wherein providing a wide-beam antenna comprises providing a panel antenna as the wide-beam antenna.

35. The method of claim 32, further comprising:
providing one or more further narrow-beam antennas in the housing, each further narrow-beam antenna being for enabling wireless communications for a respective further coverage area associated with its antenna beam, the antenna beam of each further narrow-beam antenna having a beam width that is less than the beam width of the antenna beam of the wide-beam antenna.

36. The method of claim 32,
wherein providing a wide-beam antenna comprises providing a plurality of wide-beam antennas for enabling wireless communications for a plurality of first coverage areas, and
wherein providing a housing comprises at least partially enclosing each wide-beam antenna in a respective housing, and at least partially enclosing the narrow-beam antenna in the housing of one of the wide-beam antennas.

37. The method of claim 32, further comprising:
providing in the housing one or more further radio units, each further radio unit comprising and a respective dedicated communication device and a respective narrow-beam antenna having a beam width that is less than the beam width of the antenna beam of the wide-beam antenna,
wherein each further radio unit provides a respective further backhaul communication link.

38. The method of claim 37, further comprising:
providing in the housing one or more further access radio units, each further access radio unit comprising a respective wide-beam antenna and a respective access communication device, and enabling wireless access communications for a respective further coverage area.

39. The method of claim 32, further comprising:
providing in the housing one or more further access radio units, each further access radio unit comprising a respective wide-beam antenna and a respective access communication device, and enabling wireless access communications for a respective further coverage area.

* * * * *